April 28, 1953　　　　　J. R. STEGALL　　　　　2,637,020
POWER LINE FAILURE INDICATOR
Filed Aug. 24, 1950

INVENTOR.
James R. Stegall,
BY Victor J. Evans & Co.
ATTORNEYS

Patented Apr. 28, 1953

2,637,020

UNITED STATES PATENT OFFICE 2,637,020

POWER LINE FAILURE INDICATOR

James R. Stegall, Ferriday, La.

Application August 24, 1950, Serial No. 181,233

4 Claims. (Cl. 340—250)

This invention relates to electrically actuated indicating devices for indicating trouble in high tension lines, and in particular a pair of relays connected across high voltage transmission lines on opposite sides of a disconnect or fuse with a transmitter whereby a short or blowing of the fuse stops the current to one of the relays and permits closing of the circuit to the transmitter which will feed an RF signal through a capacitor to the high voltage line which signal will be received at the source of power through another condenser designed to operate at a frequency corresponding to that of the capacitor whereby the location of the break or failure is indicated at the power house or source of power.

The purpose of this invention is to provide means for connecting a relay actuated transmitter across high tension lines on opposite sides of a disconnect or fuse whereby blowing of the fuse or trouble between the conducting points of the relays causes the transmitter to go into operation for sending a signal to the end of the line.

Dead end high tension lines for rural power supply often extend 50 to 60 miles into rural districts where telephones are not available and for this reason it is very difficult to notify the officials of a power house or send a signal to a source of power when trouble develops in the lines. With this thought in mind this invention contemplates small transmitters distributed at fuse or disconnect points along high tension lines with the transmitters actuated by relays connected to the high tension lines or positioned to be influenced thereby at points on opposite sides of the disconnect or fuse and with the transmitters connected, preferably by inductance to the high tension lines, whereby upon failure in the line between the relay connections signals are transmitted to receiving means at the end of the line or at suitable stations indicating the location of the source of trouble.

The object of this invention is, therefore, to provide means for connecting relays across high tension power lines whereby upon failure between the points of connection the transmitter is set into action to send a signal to a receiver at a remote point through the power line.

Another object of the invention is to provide means for sending a signal indicating a break in a high tension power line to the source of power without adding an additional line.

A further object of the invention is to provide transmitting means for sending a signal through high tension lines to a remote point to indicate a break in the line in which similar transmitting units positioned at spaced points along the lines are not actuated.

A still further object of the invention is to provide means for automatically sending a signal indicating a break in a high tension line through the line to a remote point showing the location of the break, which is of comparatively simple and economical construction.

With these and other objects and advantages in view the invention embodies a transformer, the primary winding of which is connected to high voltage conductors with the low voltage secondary winding connected to a transmitter and with a coil in the circuit to the transmitter for holding the circuit closed, and another transformer positioned on the opposite side of a disconnect or fuse in the high tension lines with the primary winding positioned to receive current from the high voltage line in which the fuse is positioned by inductance and in which the secondary winding thereof influences a coil for holding the transmitter circuit open as long as there is current in the lines, and means whereby the transmitter sends an RF signal through the power line to the source of power upon operation thereof.

Other features and advantages of the invention will appear from the following description taken in connection with the drawings wherein.

Figure 1:
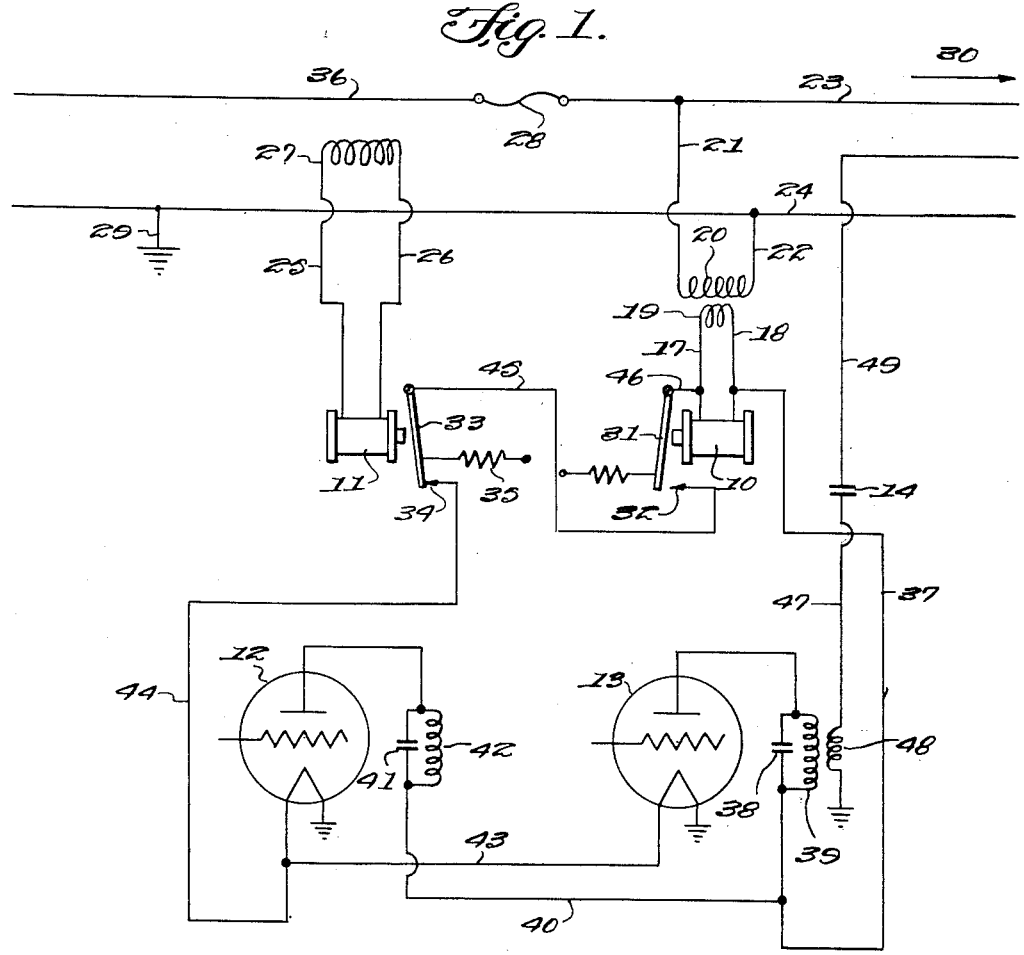
Figure 1 is a view showing a wiring diagram illustrating the relays and transmitter with the circuits connecting the parts.
Figure 2:
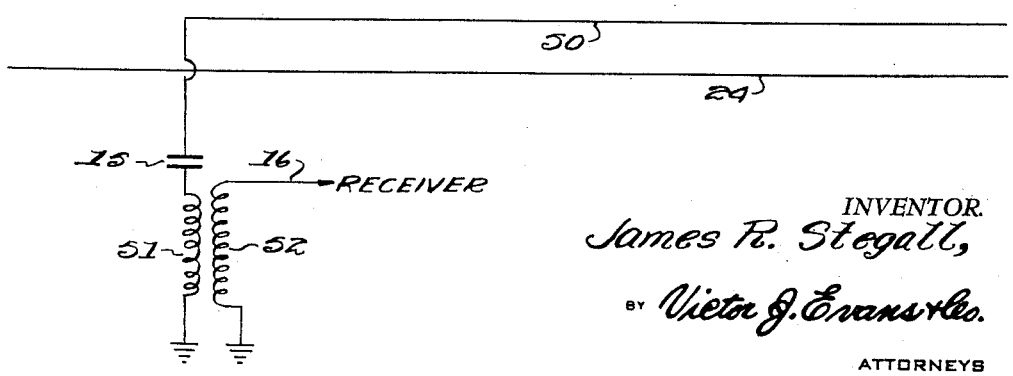
Figure 2 is a wiring diagram showing the receiver positioned at the source of power for receiving the signal sent by the transmitter.

Referring now to the drawings wherein like reference characters denote corresponding parts the power line failure signal transmitter of this invention includes a first relay having a solenoid 10, a second relay connected to an inductance coil and having a solenoid 11, a transmitter having tubes 12 and 13, a capacitor 14, a condenser 15 and a receiver 16.

The solenoid 10 is connected by wires 17 and 18 to a low voltage secondary 19 of a transformer the primary winding 20 of which is connected by wires 21 and 22 to high voltage wires 23 and 24, respectively.

The solenoid 11 is connected by wires 25 and 26 to an inductance coil 27 positioned to be influenced by the high voltage line 23 and also positioned on the side of a fuse 28 opposite to that on which the connections of the solenoid 10 are positioned. The wire 24 is grounded at a point positioned beyond the inductance coil 27, as shown at the point 29.

Upon application of power to the lines 23 and 24 from a source in the direction of the arrow 30 the solenoid 10 actuates the contacts 31 to engage a contact point 32 and the solenoid 11 actuates the contact arm 33 whereby the arm 33 disengages the contact point 34. A spring 35 urges the contact arm 33 away from the solenoid and into contact with the point 34 when no current is passing through the side 36 of the high voltage line 23.

As long as there is current in the high voltage lines 23 and 24 and the fuse 28 is operative the solenoid 11 holds the contact arm 33 away from the contact point 34 and the circuit to the tubes 12 and 13 of the transmitter is open.

Should trouble develop in the line and the fuse 28 blow so that no current is present in the line 36, the solenoid 11 is deenergized and the spring 35 draws the contact arm 33 against the contact 34 whereby current is completed supplying plate and filament voltage to the transmitter tubes, thereby causing the transmitter unit to go into operation which will feed an RF signal through the capacitor 14 back into the hot side of the high voltage line through inductance and thereby to the source of power where the condenser 15 which is designed to operate at the same frequency as that of the capacitor 14 picks up the signal, thereby indicating the location of the trouble through the receiver 16.

In this operation current continues to the solenoid 10 through the transformers 12, 20 and 19, however, in the following transmitter unit at the next disconnect or fuse, the line 36 being disconnected, current will not be supplied to the solenoid 10 of the first relay so that the transmitter of this unit and also of all following units will not send a similar signal to the source of power. By this means the transmitter positioned at the break in the line, only, will send the signal back to the source of power.

It will be understood that the type or design of the transmitter or receiver are not important as suitable units of different types may be used, however, in the design shown the tubes 12 and 13 of the transmitter unit are supplied with current from the secondary winding 19 through a wire 37 which extends through the condenser 38 and coil 39 to the plate of the tube 13, and also through the wire 40, condenser 41 and coil 42 to the plate of the tube 12. The filaments of the tubes are connected by a wire 43 which is connected by a wire 44 to the contact 34. The contact arm 33 is connected by a wire 45 of the contact 32 and the contact arm 31 is connected by a wire 46 to the opposite side of the winding 19 through the wire 17.

The capacitor 14 is connected by a wire 47 to a coil 48 positioned to receive current from the coil 39 and from the opposite side of the capacitor or condenser a wire 49 extends parallel to the wires 23 and 24 whereby the signal is transmitted to the high voltage lines by inductance.

A similar wire 50, positioned parallel to the high voltage lines 23 and 24 at the source of power receives the signal which is transmitted to the receiver through the condenser 15 and the coils 51 and 52.

With the parts arranged in this manner the points where a failure occurs in a power line is instantly transmitted to a receiving station, power house, or the like.

It will be understood that modifications may be made in the design and arrangement of the parts without departing from the spirit of the invention.

What is claimed is:

1. A power line failure indicator comprising a normally energized first relay for holding a pair of contacts associated therewith normally closed, said relay connected across two current carrying lines, one of said lines having a fuse therein, a normally energized second relay located on the side of the fuse opposite to the side on which the first relay is located and positioned to receive current from the said current carrying lines, said second relay retaining a pair of contacts associated therewith normally open, a transmitter, a circuit connecting the said transmitter to the contacts of the first relay through the said contacts of the second relay, means closing the contacts of the second relay upon blowing of the fuse whereby current is supplied to the transmitter, means whereby the transmitter sends a signal through the power lines when current is supplied thereto, and receiving means of a frequency corresponding to the sending means of the transmitter positioned at a remote point on the said power lines.

2. A power line failure indicator comprising a normally energized first relay for holding a pair of contacts associated therewith normally closed, said relay connected across two current carrying lines, one of said lines having a fuse therein, a normally energized second relay located on the side of the fuse opposite to the side on which the first relay is located and positioned to receive current from the said current carrying lines, said second relay retaining a pair of contacts associated therewith normally open, a transmitter, a circuit connecting the said transmitter to the contacts of the first relay through the said contacts of the second relay, means closing the contacts of the second relay upon blowing of the fuse whereby current is supplied to the transmitter, a capacitor positioned to receive current from the transmitter for sending a signal through the power line, and a receiver having a condenser of a frequency corresponding to that of the capacitor positioned to receive current from the said power lines.

3. A power line failure indicator for high voltage lines having fuses or other disconnects positioned at spaced points therein, a transformer, the primary winding of which is connected across the said power line on one side of the fuse, a relay connected to a secondary winding of the transformer, an inductance coil located on the opposite side of the fuse and positioned to receive current from one of said lines, a relay connected to the said inductance coil, pairs of contact arms positioned to be actuated by said relays, a transmitter having a circuit extended through the contact arms of the relays and connected to the secondary winding of the transformer, one pair of said contact arms positioned to be actuated by the relay connected to the secondary winding of the transformer being normally closed with current in said high voltage lines and adapted to hold the circuit to the transmitter closed upon blowing of the fuse, and another pair of said contact arms positioned to be held open by the relay connected to said inductance coil and adapted to close the circuit to the transmitter upon blowing of the fuse, a capacitor positioned to be actuated by the transmitter and having an extended wire positioned to transmit a signal to one of the said high voltage wires, a receiver positioned at a remote point along said power lines, and a condenser in said receiver having a frequency corresponding to that of the capacitor of the transmitter.

4. In a power line failure indicator, the combination which comprises a pair of high voltage power lines having a fuse in one of said lines, a transformer having a primary winding one end of which is connected to one of said power lines and the other to the other of said power lines, a solenoid, a secondary winding of the transformer connected to said solenoid, an inductance winding positioned to receive current from the power line having a fuse therein and located on the side of the fuse opposite to that on which the transformer is positioned, a solenoid connected to said inductance coil, a transmitter, a transmitter circuit connected to the secondary winding of the transformer and having pairs of contact arms therein positioned to be actuated by the said solenoids, one pair of said contact arms positioned to be actuated by the relay connected to the secondary winding of the transformer being normally closed with current in said high voltage lines and adapted to hold the circuit to the transmitter closed upon blowing of the fuse, and another pair of said contact arms positioned to be held open by the relay connected to said inductance coil and adapted to close the circuit to the transmitter upon blowing of the fuse, a capacitor for sending a signal as a circuit is completed to the transmitter, said capacitor positioned to transmit the signal to one of the said power lines, a receiver positioned at a remote point and a condenser of the same frequency as that of the capacitor also positioned to receive a signal from the said power line that receives the signal from the capacitor.

JAMES R. STEGALL.

References Cited in the file of this patent

UNITED STATES PATENTS

| Number    | Name          | Date          |
|-----------|---------------|---------------|
| 2,068,293 | Ilgenfritz    | Jan. 19, 1937 |
| 2,260,160 | Benning et al.| Oct. 21, 1941 |
| 2,337,441 | Atkinson et al.| Dec. 21, 1943 |
| 2,460,789 | Thompson      | Feb. 1, 1949  |